US009824161B1

(12) United States Patent
Enden et al.

(10) Patent No.: US 9,824,161 B1
(45) Date of Patent: Nov. 21, 2017

(54) PROVIDING THIRD PARTY ANSWERS

(71) Applicant: Google Inc., Mountain View, CA (US)

(72) Inventors: Sivan Enden, Tel Aviv (IL); Gaal Yahas, Tel Aviv (IL); Amit Weinstein, Tel Aviv (IL); Michael Fink, Tel Aviv (IL); Niv Efron, Givataim (IL); Anatoly Vorobey, Rishon LeZion (IL); Eyal Fink, Ramat Gan (IL); Eyal M. Cohen, Tel Aviv (IL)

(73) Assignee: Google Inc., Mountain View, CA (US)

( * ) Notice: Subject to any disclaimer, the term of this patent is extended or adjusted under 35 U.S.C. 154(b) by 746 days.

(21) Appl. No.: 14/074,904

(22) Filed: Nov. 8, 2013

Related U.S. Application Data

(60) Provisional application No. 61/844,661, filed on Jul. 10, 2013.

(51) Int. Cl.
*G06F 17/30* (2006.01)
(52) U.S. Cl.
CPC .............................. *G06F 17/30979* (2013.01)
(58) Field of Classification Search
CPC .................................................. G06F 17/30979
See application file for complete search history.

(56) References Cited

U.S. PATENT DOCUMENTS

| 6,944,612 | B2* | 9/2005 | Roustant | G06F 17/30867 |
| | | | | 707/706 |
| 7,617,176 | B2 | 11/2009 | Zeng et al. | |
| 8,214,347 | B2 | 7/2012 | Matson | |
| 2012/0226681 | A1* | 9/2012 | Paparizos | G06F 17/3053 |
| | | | | 707/723 |
| 2013/0066889 | A1* | 3/2013 | Rodriguez | G06F 17/30864 |
| | | | | 707/754 |
| 2014/0006012 | A1* | 1/2014 | Zhou | G06F 17/30654 |
| | | | | 704/9 |
| 2014/0142920 | A1* | 5/2014 | Chu-Carroll | G06F 17/30401 |
| | | | | 704/9 |

* cited by examiner

*Primary Examiner* — Kris Mackes
(74) *Attorney, Agent, or Firm* — Fish & Richardson P.C.

(57) ABSTRACT

Methods, systems, and apparatus, including computer programs encoded on a computer storage medium, for providing a representation based on structured data in resources. The methods, systems, and apparatus include actions of obtaining search results for a search query. Each search result references a respective resource, the respective resources including a first resource and a second resource. Additional actions include determining a consistent value, that is consistent with both a value for a particular property as indicated by structured data in the first resource and a value for the particular property as indicated by structured data in the second resource. Further actions include in response to determining a consistent value, providing (i) a representation of the consistent value as a possible answer to the search query, and (ii) the search results.

12 Claims, 3 Drawing Sheets

PROVIDING THIRD PARTY ANSWERS

CROSS-REFERENCE TO RELATED APPLICATIONS

This application claims the benefit of U.S. Provisional Patent Application No. 61/844,661, filed Jul. 10, 2013, the entirety of which is hereby incorporated by reference as if fully set forth therein.

TECHNICAL FIELD

This disclosure generally relates to search engines.

BACKGROUND

Search engines can provide results to search queries. When a user searches an answer for a query, in many cases the user must click on several links in order to get the desired answer.

SUMMARY

In general, an aspect of the subject matter described in this specification may involve a process for providing a response to a search query. The response may be a concise answer to the user's search query. For example, if the system receives a search query "Toto, I've got a feeling," the system may provide a search results page that includes a representation of the entire quote, e.g., the desired answer, that corresponds to the search query, e.g., "Toto, I've got a feeling we're not in Kansas anymore," followed by search results that reference resources that are relevant to the search query. Accordingly, the representation may allow a user to get a desired answer e.g., the text of the entire quote and speaker of the quote, without needing to separately navigate to a particular resource and identify a relevant portion in the particular resource.

The system may provide the representation based on analyzing the search results for the search query, or the resources referenced by the search results. For example, the search results may reference resources that are determined to be relevant to the search query, e.g., include the text "Toto, I've got a feeling." Resources may include webpages, documents, videos, or images.

Certain resources may include structured data provided by the creator of the resources, e.g., a third party. For example, a webpage may include structured markup data defined using a structured data standard, e.g. schema.org markup. The structured data may include properties that may have particular values. For example, a structured data item for a quote may have a property of "speaker," where the value, e.g., "Dorothy Gale," of the property may represent the speaker of the quote.

Before providing a representation, the system may parse the resources that are referenced by the search results to determine if the resources include structured data and extract the structured data from the resources. If the system determines that multiple resources referenced by search results include an item of structured data that has a similar or identical value for at least one property across the multiple resources, the system may provide a representation of the value of the at least one property.

For example, if the system determines that multiple resources include structured data for quotes that have a value of "Dorothy Gale" for the "speaker" property and a value of "Toto, I've got a feeling we're not in Kansas anymore" as a "description" property, the system may provide a representation including the values of the "speaker" and "description" properties.

In determining the values to represent, the system may consider the search result ranking of the resources for which the values are consistent, the number of resources for which the value is consistent, the topics of the resources for which the value is not consistent, or records of user selections in response to a representation including a value. In providing the representation of the value, the system may identify a template for formatting the value based on a type of the structured data including the value.

In some aspects, the subject matter described in this specification may be embodied in methods that may include the actions of obtaining search results for a search query. Each search result references a respective resource, the respective resources including a first resource and a second resource. Additional actions include determining a consistent value, that is consistent with both a value for a particular property as indicated by structured data in the first resource and a value for the particular property as indicated by structured data in the second resource. Further actions include in response to determining a consistent value, providing (i) a representation of the consistent value as a possible answer to the search query, and (ii) the search results.

Other versions include corresponding systems, apparatus, and computer programs, configured to perform the actions of the methods, encoded on computer storage devices.

These and other versions may each optionally include one or more of the following features. For instance, in some implementations determining a consistent value that is consistent with both a value for a particular property as indicated by structured data in the first resource and a value for the particular property as indicated by structured data in the second resource includes determining that the value for the particular property as indicated by the structured data in the first resource is consistent with (i) the value for the particular property as indicated by the structured data in the second resource and (ii) one or more values for the particular property as indicated by structured data in one or more additional resources.

In certain aspects, determining a consistent value that is consistent with both a value for a particular property as indicated by structured data in the first resource and a value for the particular property as indicated by structured data in the second resource includes determining that the property as indicated by structured data in the first resource and the property as indicated by structured data in the second resource have values that are identical or similar.

In some aspects, determining a consistent value that is consistent with both a value for a particular property as indicated by structured data in the first resource and a value for the particular property as indicated by structured data in the second resource is based on a rank in the search results of the first resource and a rank in the search results of the second resource.

In some implementations, determining a consistent value that is consistent with both a value for a particular property as indicated by structured data in the first resource and a value for the particular property as indicated by structured data in the second resource is based on a determined number of the resources referenced by the search results for which the value of the property of the first resource is consistent.

In certain aspects, determining a consistent value that is consistent with both a value for a particular property as indicated by structured data in the first resource and a value for the particular property as indicated by structured data in the second resource is based on topics of the two or more of the search results and one or more topics of one or more resources of the search results that are determined not to include structured data with a property that has a value that is consistent with the value of the property as indicated by structured data in the first resource.

In some aspects, determining a consistent value that is consistent with both a value for a particular property as indicated by structured data in the first resource and a value for the particular property as indicated by structured data in the second resource is based on records of user selections in response to previously providing information from structured data.

In some implementations, providing (i) a representation of the consistent value as a possible answer to the search query, and (ii) the search results includes generating a snippet from the value of the particular property as indicated by the first resource according to a template corresponding to a type of structured data, providing the generated snippet, and providing a link to the first resource.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

A server may receive a search query and provide a response to the search query. The response may include a concise answer to the user's search query. For example, if the system receives a search query "learn from yesterday," the system may provide a search results page that includes a representation of an entire quote that corresponds to the search query, e.g., "Learn from yesterday, live for today, hope for tomorrow, as a possible answer to the search query. The important thing is not to stop questioning," followed by search results that reference resources that are relevant to the search query. Accordingly, the representation may allow a user to see the text of the entire quote and speaker of the quote without needing to navigate to a particular resource and identify a relevant portion of the resource.

The system may provide the representation based on search results to the search query. For example, the search results may include resources that include the text "learn from yesterday." Certain resources may include structured data that is provided by the creator of the resources. For example, a webpage may include structured markup data defined using a structured data standard, e.g. schema.org markup. The structured data may each include properties that may have particular values. For example, a structured data item for a quote may have a property of "speaker," where the value of the property of "Albert Einstein" may represent the speaker of the quote.

The system may parse the resources that are referenced by the search results to determine if the resources include structured data and extract the structured data from the resources. If the system determines that multiple resources include an item of structured data that has a similar or identical value for at least one property across the multiple resources, the system may provide a representation of the value of the at least one property. The value the system represents may be referred to as a consistent value, and may be consistent with values of the property across the multiple resources.

For example, if the system determine that multiple resources include structured data for quotes that have a value of "Albert Einstein" for the "speaker" property, and a value of "Learn from yesterday, live for today, hope for tomorrow. The important thing is not to stop questioning," as a "text" property, the system may provide a representation of the values of the "speaker" and "text" properties.

In determining the values to represent, the system may consider the ranks of the resources from which the values are consistent, the number of resources for which the value is consistent, the topics of the resources for which the value is not consistent, or records of user selections in response to a representation including a value. In providing the representation of the value, the system may identify a template for formatting the value based on a type of the structured data including the value.

Figure 1:
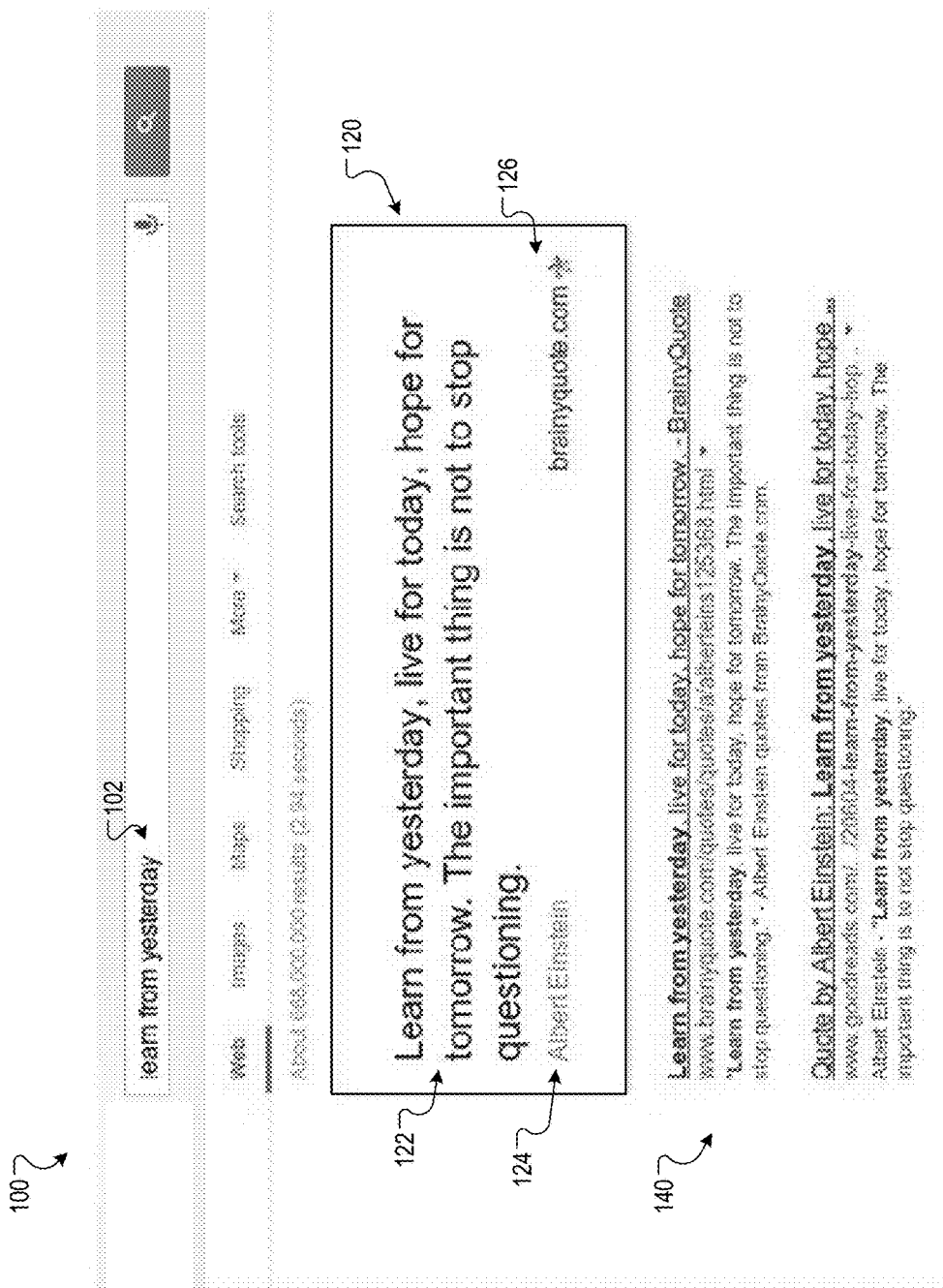
FIG. 1 is an illustration of an example search results page including a representation based on structured data in resources.

FIG. 1 is an illustration of an example search results page 100 including a representation 120 based on structured data in resources referenced by search results 140. The search results page 100 may be provided in response to a search query 102, "learn from yesterday." The search query 102 is shown as text in a search field. The search results page 100 includes a representation 120 of structured data. As shown, the representation 120 is of structured data for a quote, "Learn from yesterday, live for today, hope for tomorrow. The important thing is not to stop questioning" by Albert Einstein, included in a webpage from the website "www.example.com."

The webpage may include structured markup data using the Schema.org structured data standard, microformats standard, or OpenCyc standard. The structured markup data may define structured data that represents the quote, as shown in Table 1:

TABLE 1

```
<div itemscope itemtype="http://schema.org/CreativeWork">
<span itemprop="description"> Learn from yesterday, live for today,
  hope for tomorrow. The important thing is not to stop questioning.
  </span>
<div itemprop="author" itemscope itemtype="http://schema.org/Person">
  <span itemprop="name">Albert Einstein</span>
</div>
</div>
```

As shown in the example markup data above, the structured data includes a property of "description" for which the value corresponds to the text of the quote and a property of "author" for which the value corresponds to the speaker of the quote. The properties may be defined using markup data that is not displayed when the webpage is rendered in a browser, e.g., "itemprop=name," and that does not define how the webpage is rendered, but rather describes the meaning of content, e.g., a value, that is included in the webpage. The values, e.g., "Albert Einstein," of the properties may be displayed when the webpage is rendered.

The representation 120 includes the value of the "description" property 122 and a value of the "author" property 124. The representation 120 further includes an attribution 126 identifying the resource which includes the structured data, e.g., a logo for the website BrainyQuote.com. The representation 120 may be selectable so that if the system receives a user selection from the user on any portion of the representation 120, the system may direct the user to the resource which includes the represented value in structured data. A selection of a representation can be, e.g., a user action made with respect to the representation that initiates a request for the resource identified by the representation. For example, the user action with respect to the representation may be a "click" on the representation, a voice-based selection, or a selection by a user's finger on a presence-sensitive input mechanism, e.g., a touch-screen device, or any other appropriate selection mechanism. In some implementations, selection data may not be tethered to the identity of individual users.

The search results page 100 further includes a list of search results 140 that are associated with resources that are relevant to the search query. As shown in the listing, the first resource in the listing, e.g., the resource ranked as the most likely to be relevant to the search query, is the resource which includes the structured data that is represented.

However, as described below, the structured data that is represented is not necessarily included in the first resource in the listing. For example, if the structured data in all resources referenced by the search results 140 except for the first resource are consistent and are inconsistent with the structured data in the first resource, the system may represent the structured data from another resource, e.g., the second resource listed or the third resource listed, may be represented. Additionally or alternatively, the first resource may not include structured data or the first resource may be determined to be a resource from which structured data should not be represented, so the system may represent the structured data from another resource.

Figure 2:
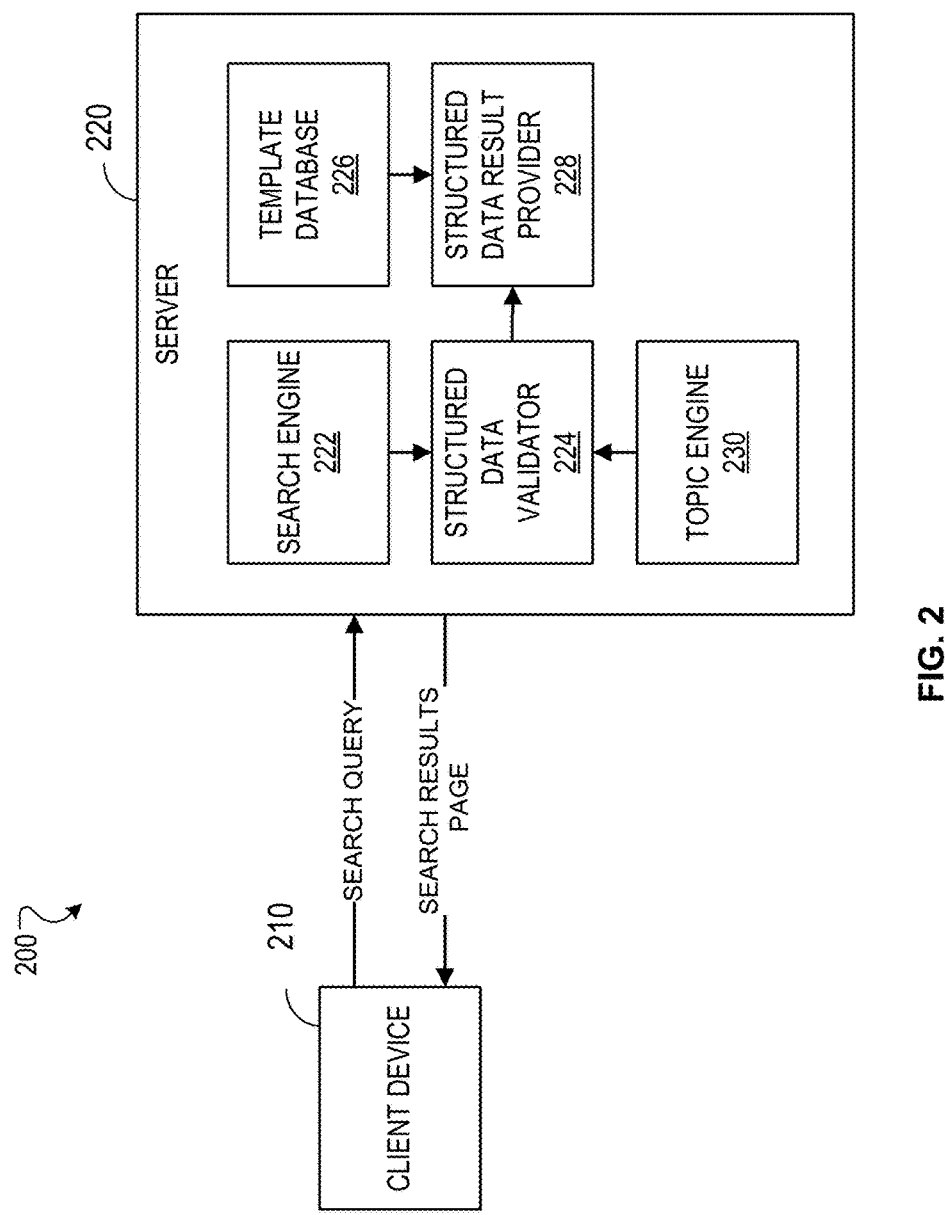
FIG. 2 is a block diagram of an example system for providing a representation based on structured data in resources.

FIG. 2 is a block diagram of an example system 200 for providing a representation based on structured data in resources. The system 200 may include a client device 210 and a server 220. The client device 210 may be a computing device used by a user for providing a search query to the server 220 and providing search query results received from the server 220 to the user. For example, the client device 210 may be a personal desktop computer, a mobile phone, a laptop, or a tablet that may display a search results page to the user.

The server 220 may be one or more computing devices that receive search queries from the client device 210 and provides a search results page to the client device 210. The search results page may include a representation based on structured data in resources referenced by the search results also included in the search results page.

The server 220 may include a search engine 222, a structured data validator 224, a topic engine 230, a template database 226, and a structured data result provider 228. The search engine 222 may receive a search query and identify search results that reference resources that are determined to be relevant to the search query. For example, the search engine 222 may identify resources that include words that match one or more words in the search query.

The validator 224 may receive the search results and identify structured data in the resources referenced by the search results. For example, the validator 224 may iteratively navigate to each of the resources referenced by the search results. The validator 224 may parse source code of the resources to identify and extract structured data that is included in the resources. Additionally or alternatively, the resources referenced by the search results may be accessed, extracted, and stored before the search query is received so that the validator 224 can identify structured data included in the resources by accessing the pre-extracted data regarding structured data included in the resources.

After the validator 224 identifies structured data included in the resources, the validator 224 may determine that multiple resources include structured data that has a consistent, e.g., similar or identical value, for at least one property across the multiple resources. For example, the validator 224 may determine that the first and second resources referenced by the search results include structured data that include a property of "description" with the value of "Learn from yesterday, live for today, hope for tomorrow. The important thing is not to stop questioning," and a property of "author" with the value of "Albert Einstein."

The validator 224 may make the determination based on a number of factors. The validator 224 may consider the ranks of the resources in the ranking of the resources. The validator 224 may consider the resources in which the values are consistent. For example, the validator 224 may be more likely to make a determination of consistency for a value if the resources in which the value is identical or similar are higher ranked in the search results, e.g., near the beginning of a list of search results ordered by most likely to be relevant to least likely to be relevant.

The validator 224 may also consider the ranks of the resources in which the value is not consistent. For example, the validator 224 may be more likely to make a determination that there is no consistency for a value if the resources in which the value is not identical or not similar are higher ranked in the search results.

The validator 224 may consider the number of resources for which the value is identical or similar. For example, the validator 224 may be more likely to make a determination of consistency the more resources there are for which the value is identical or similar. On the other hand, the validator 224 may be less likely to make a determination of consistency the less resources there are for which the value is identical or similar.

The validator 224 may consider the topics of the resources for which the value is not identical or similar. For example, even if the validator 224 determines that resources referenced by the search results does not include structured data or include structured data that is not identical or similar with the value, the validator 224 may be more likely to make a determination of consistency if topics for the resources are related or identical to the topics for the resources that include structured data with values that are identical or similar. In considering topics in the determination of consistency, the validator 224 may weight more heavily the topics of resources that are ranked as more likely to be relevant than that topics of resources that are ranked as less likely to be relevant.

The validator 224 may determine the topics of resources based on receiving topics associated with the resources from a topic engine 230. For example, the validator 224 may identify the referenced resources to the topic engine 230 and, in response, the topic engine 230 may provide the topics associated with the resources to the validator 224.

To provide the topics to the validator 224, the topic engine 230 may access the various resources to determine topics associated with the resources. The topic engine 230 may make the determination of topics based on metadata in a resource included by a creator or non-metadata in the resource. The topic engine 230 may make the determination of topics based on identifying topics associated with the resources by the topic engine 230 in advance of receiving identifications of the resources from the validator 224.

The validator 224 may consider records of user selections in response to a representation including a value. For example, the validator 224 may be less likely to make a determination of consistency for a particular value if the validator 224 determines that records of user selections of search results indicate that users were previously presented a representation including the value but selected to navigate to a resource that does not include structured data with a value identical or similar with the represented value.

A selection of a search result can be, e.g., a user action made with respect to the search result that initiates a request for the resource identified by the search result. For example, the user action with respect to the search result may be a "click" on the search result, a voice-based selection, or a selection by a user's finger on a presence-sensitive input mechanism, e.g., a touch-screen device, or any other appropriate selection mechanism.

On the other hand, the validator 224 may be more likely to make a determination of consistency for a particular value if validator 224 determines that the records of user selections indicate that users were previously presented a representation including the value and selected to navigate to a resource that includes structured data with a value identical or similar with the represented value.

The validator 224 may additionally or alternatively consider how user selections change in response to the users being provided a particular representation. For example, the validator 224 may determine from the record of user selections that when a value is represented from a first ranked resource, the rate at which the first ranked resource is selected by the user is reduced. The reduction in the rate that the first ranked resource is selected may indicate that the value represented is not desirable in response to the search query, so users are not selecting the first ranked resource that is represented as being the source of the undesirable represented value.

Based on the determination that the selection rate of the first ranked resource is reduced, the validator 224 may determine that the previously represented value should not be represented in response to the search query. Accordingly, the validator 224 may instead represent another value from structured data in the first ranked resource, or may represent another value from another resource. Additionally or alternatively, if the validator 224 determines that the record of user selections indicate that another resource, e.g., a fourth ranked resource, is more frequently selected when a value from a first ranked resource is represented, the validator 224 may determine to represent a value from the other resource.

If there are multiple different items of structured data that have values that are consistent, the validator 224 may also determine a particular value of the structured data to represent based on the search ranks of the resources including the particular value, the number of resources including the particular value, the topics for the resources referenced by the search results, and records of user selections in response to representations.

Based on the determination, the validator 224 may provide the value of the property to a structured data result provider 228. The provider 228 may include a representation of the value in a search results page provided to the client device 210. For providing the representation of the value, the system 220 may include a template database 226. The template database may include templates for formatting the value based on a type of the structured data including the value.

For example, the template may designate that when representing a quote, a value for a property of "description" should be included at the top of the representation, a value for a property of "author" should be included below the value of the description, and an attribution identifying the resource including structured data should be included below the value of the description and to the right of the value of the author. Other templates may designate different ways of representing values from properties in structured data.

The provider 228 may access the template database 226 to retrieve the templates and identify a template that corresponds with the value of the property of the structured data determined by the validator 224 to be consistent for multiple resources. For example, the structured data may include a type and the template may be identified by the provider 228 based on the value of the type. The provider 228 may then provide a representation based on applying the template to the value. For example, the provider 228 may generate the representation 120 from the structured data shown in Table 1 based on a template.

Different configurations of the system 200 may be used where functionality of the search engine 222, the structured data validator 224, the template database 226, and the structured data result provider 228 may be combined, further distributed, or interchanged. The system 200 may be implemented in a single device or distributed across multiple devices.

Figure 3:
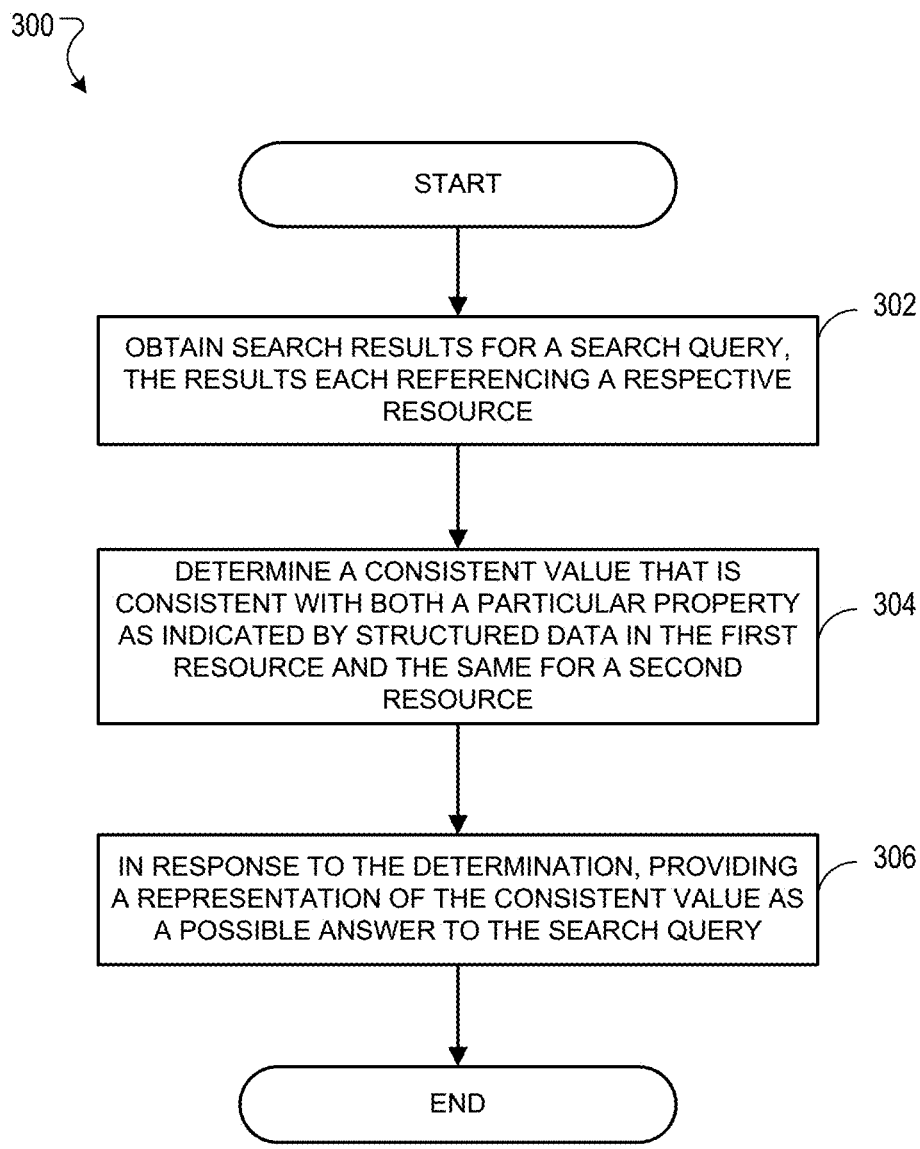
FIG. 3 is a flowchart of an example process for providing a representation based on structured data in resources.

FIG. 3 is a flowchart of an example process 300 for providing a representation based on structured data in resources. The following describes the process 300 as being performed by components of the system 200 that are described with reference to FIG. 2. However, the process 300 may be performed by other systems or system configurations.

The process 300 may include obtaining search results for a search query, the results each referencing a respective resource (302). For example, the system 200 may obtain search results in response to a search query, "Revenge of the," using search engine 222. The search engine 222 may determine search results including ten or more webpages ordered by relevancy to the search query.

The process may include determining a consistent value that is consistent with both a value for a particular property as indicated by structured data in the first resource and the same for a second resource (304). For example, the structured data validator 224 may determine that the first search result is a webpage that includes structured data defining movie including a property of "name" with the value "Revenge of the Nerds" and a property of "director" with the value of "Jeff Kanew," and the second and third search results reference webpages that include structured data defining a movie with identical or similar properties and values for the properties. The consistent value may include "Revenge of the Nerds" or "Jeff Kanew," or both.

In making the determination, the validator 224 may obtain structured data for the resources by parsing and extracting structured data from the resources referenced by the search results, or may obtain pre-extracted structured data for the resources. In making the determination, the validator 224 may also determine that sixth and eighth search results reference webpages include structured data that include a property of "name" with the value "Episode III: Revenge of the Sith" with a property of "director" with the value of "George Lucas."

However, the validator 224 may determine that values for the structured data for "Revenge of the Nerds" should be represented and values for the structured data for "Episode III: Revenge of the Sith" should not be represented as the values for the structured data for "Revenge of the Nerds" appear in resources referenced by higher ranked search results and referenced by more search results. Based on the determinations, the validator 224 may determine that the value of "Revenge of the Nerds" with a property of "director" with the value of "Jeff Kanew" for the first search result is consistent with the same for the second resource.

The process 300 may include in response to the determination, providing a representation of the consistent value as a possible answer to the search query (306). For example, the structured data result provider 228 may access templates from the template database 226 and identify a template from the templates that corresponds with the value to be represented. In the example, the provider 228 may obtain structured data for the movie, "Revenge of the Nerds," identify a template for generating a representation for a movie, and include in the search results page a panel including the title of the movie, year of showing, director, movie poster, a video clip from the movie, an audio clip from the movie, a screenshot from the movie, and the website including the structured data. The process 300 may further provide the representation with the search results. For example, the representation and search results may be provided in a search results page that shows the representation above the search results.

As described above, the representation may be provided visually using text and video, or provided by audio. Accordingly, the representation may allow a user to get a desired answer to a search query without needing to separately navigate to a particular resource and identify a relevant portion in the particular resource.

Additionally, while the process 300 described above describes representing of a value of structured data if the value is determined to be consistent in a first resource and a second resource, the process 300 may represent a value of structured data when the value of structured data is consistent in three or more resources. For example, the server 220 may only represent the value of the structured data if it is consistent in at least three out of the five resources ranked highest in the search results.

Additionally or alternatively, the process 300 may represent a value of structure data even when only one resource includes the structured data. For example, the server 220 may represent the structured data in a first resource if the first resource is determined to be particularly authoritative. A resource considered to be authoritative may be considered to be more likely to include factually accurate information.

The process 300 may determine a resource is particularly authoritative based on an authoritative score for the resource that represents authoritativeness of the resource. For example, the server 220 may identify a predetermined authoritative score associated with the resource or calculate an authoritative score for the resource based on user feedback, e.g., user confirmations that the resource is authoritative or records of user selections, the identity of the source of the resource, e.g., the identity of the website that provides the resource, or how many other resources reference the resource. The process 300 may determine to represent the value in the resource if the authoritative score satisfies a predetermined threshold score, e.g., is above a minimum threshold score when a higher authoritative score represents an increased likelihood to be authoritative.

The process 300 may also consider the rank of the resource in the search results in determining whether a value of structured data that is not consistent in other resources is to be represented. For example, the server 220 may weight the authoritative score based on the rank of the resource in the search results so that higher ranked resources are weighted to have higher authoritative scores.

In some implementations, in determining the value to represent, the server 220 may consider the authoritative scores of the resources, the ranks of the resources from which the values are consistent, the number of resources for which the value is consistent, the topics of the resources for which the value is not consistent, and records of user selections in response to a representation including a value, in some combination. For example, the server 220 may represent a value from structured data included in a single resource when the resource has a high authoritative score and may represent a value from structured data when three or more resources having low authoritative scores include the value.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:
1. A computer-implemented method comprising:
obtaining search results for a search query, each search result referencing a respective webpage resource, the respective resources including a first webpage resource and a second webpage resource, and each of the webpage resources being different from each other resource;
for each webpage resource referenced by the search results obtained:

identifying, within the webpage resource, structured data;

identifying, for the webpage resource, a topic of the webpage resource;

determining, from the structured data within the webpage resource, textual values included in the structured data and, for each textual value, an associated property value;

wherein multiple topics are identified for the webpage resources;

determining a textual value as a consistent value based on a number of different webpage resources that each have a matching topic and that include structured data having an identical textual value and an identical associated property value determined from the structured data, wherein the number of different webpage resources is exclusive of the webpage resources referenced by the search results that do not have a topic that matches the matching topic; and in response to determining a consistent value, providing (i) a representation of the consistent value as a possible answer to the search query, and (ii) the search results.

2. The method of claim 1, wherein determining a textual value as a consistent value is based, in part, on a rank in the search results of the first resource and a rank in the search results of the second resource.

3. The method of claim 1, wherein determining a textual value as a consistent value is based, in part, on records of user selections in response to previously providing information from structured data.

4. The method of claim 1, wherein providing (i) a representation of the consistent value as a possible answer to the search query, and (ii) the search results comprises:

generating a snippet from the value of the particular property as indicated by a first resource according to a template corresponding to a type of structured data;

providing the generated snippet; and providing a link to the first resource.

5. A computer-implemented method comprising:

obtaining search results for a search query, each search result referencing a respective resource, the respective resources including a first resource and a second resource, and each of the resources being different from each other resource;

for each resource referenced by the search results obtained:

identifying, within the resource, structured data;

determining, from the structured data within the resource, textual values included in the structured data and, for each textual value, an associated property value;

determining a consistent value between structured data from the first a set of the webpage resources, and structured data from the second resource based on a textual value and its associated property value determined from the structured data in the first resource being identical to a textual value and its associated property value determined from the structured data in the second resource; and in response to determining a consistent value, providing (i) a representation of the consistent value as a possible answer to the search query, and (ii) the search results;

wherein determining a consistent value is based, in part, on topics of two or more search results and one or more topics of one or more resources of the search results that are determined not to include structured data with a property that has a value that is consistent with the value of the property as indicated by structured data in a first resource.

6. A non-transitory computer-readable medium storing software comprising instructions executable by one or more computers which, upon such execution, cause the one or more computers to perform operations comprising:

obtaining search results for a search query, each search result referencing a respective webpage resource, and each of the webpage resources being different from each other resource;

for each webpage resource referenced by the search results obtained:

identifying, within the webpage resource, structured data;

identifying, for the webpage resource, a topic of the webpage resource;

determining, from the structured data within the webpage resource, textual values included in the structured data and, for each textual value, an associated property value;

wherein multiple topics are identified for the webpage resources;

determining a textual value as a consistent value based on a number of different webpage resources that each have a matching topic and that include structured data having an identical textual value and an identical associated property value determined from the structured data, wherein the number of different webpage resources is exclusive of the webpage resources referenced by the search results that do not have a topic that matches the matching topic; and in response to determining a consistent value, providing (i) a representation of the consistent value as a possible answer to the search query, and (ii) the search results.

7. The medium of claim 6, wherein determining a textual value as a consistent value is based, in part, on a rank in the search results of the first resource and a rank in the search results of the second resource.

8. The medium of claim 6, wherein determining a textual value as a consistent value is based, in part, on records of user selections in response to previously providing information from structured data.

9. The medium of claim 6, wherein providing (i) a representation of the consistent value as a possible answer to the search query, and (ii) the search results comprises:

generating a snippet from the value of the particular property as indicated by a first resource according to a template corresponding to a type of structured data;

providing the generated snippet; and providing a link to the first resource.

10. A non-transitory computer-readable medium storing software comprising instructions executable by one or more computers which, upon such execution, cause the one or more computers to perform operations comprising:

obtaining search results for a search query, each search result referencing a respective resource, the respective resources including a first resource and a second resource, and each of the resources being different from each other resource;

for each resource referenced by the search results obtained:

identifying, within the resource, structured data;

determining, from the structured data within the resource, textual values included in the structured data and, for each textual value, an associated property value;

determining a consistent value between structured data from the first a set of the webpage resources, and structured data from the second resource based on a textual value and its associated property value determined from the structured data in the first resource being identical to a textual value and its associated property value determined from the structured data in the second resource; and in response to determining a consistent value, providing (i) a representation of the consistent value as a possible answer to the search query, and (ii) the search results;

wherein determining a consistent value is based, in part, on topics of two or more search results and one or more topics of one or more resources of the search results that are determined not to include structured data with a property that has a value that is consistent with the value of the property as indicated by structured data in a first resource.

11. A system comprising:

one or more computers and one or more storage devices storing instructions that are operable, when executed by the one or more computers, to cause the one or more computers to perform operations comprising:

obtaining search results for a search query, each search result referencing a respective webpage resource, the respective resources including a first webpage resource and a second webpage resource, and each of the webpage resources being different from each other resource;

for each webpage resource referenced by the search results obtained:

identifying, within the webpage resource, structured data;

identifying, for the webpage resource, a topic of the webpage resource;

determining, from the structured data within the webpage resource, textual values included in the structured data and, for each textual value, an associated property value;

wherein multiple topics are identified for the webpage resources;

determining a textual value as a consistent value based on a number of different webpage resources that each have a matching topic and that include structured data having an identical textual value and an identical associated property value determined from the structured data, wherein the number of different webpage resources is exclusive of the webpage resources referenced by the search results that do not have a topic that matches the matching topic; and in response to determining a consistent value, providing (i) a representation of the consistent value as a possible answer to the search query, and (ii) the search results.

12. The system of claim 11, wherein determining a textual value as a consistent value is based, in part, on a rank in the search results of the first resource and a rank in the search results of the second resource.

\* \* \* \* \*